United States Patent [19]

Bond

[11] Patent Number: 4,478,242

[45] Date of Patent: Oct. 23, 1984

[54] FINGER-ACTUATED PUSH-PULL SLIDEABLE DISPENSING VALVE

[75] Inventor: Curtis J. Bond, Worthington, Ohio

[73] Assignee: Liqui-Box Corporation, Worthington, Ohio

[21] Appl. No.: 526,330

[22] Filed: Aug. 25, 1983

[51] Int. Cl.³ .................................. F16K 35/00
[52] U.S. Cl. .................................. 137/383; 137/797; 251/100; 251/353; 222/153; 222/541; 222/559
[58] Field of Search ............... 222/559, 561, 541, 153, 222/107; 137/383, 384, 797; 251/346, 351, 353, 100

[56] References Cited

U.S. PATENT DOCUMENTS

| | | | |
|---|---|---|---|
| 648,455 | 5/1900 | Farson | 251/353 |
| 1,397,220 | 11/1921 | Lord | 251/353 |
| 1,548,241 | 8/1925 | Anderson | 251/353 |
| 2,772,037 | 11/1956 | Rieke | 222/541 |
| 3,493,146 | 2/1970 | Conners et al. | 222/153 |
| 3,797,704 | 3/1974 | Dykes | 251/100 |

FOREIGN PATENT DOCUMENTS

| | | | |
|---|---|---|---|
| 852531 | 2/1940 | France | 251/353 |
| 858699 | 11/1940 | France | 251/353 |

Primary Examiner—A. Michael Chambers
Attorney, Agent, or Firm—William V. Miller

[57] ABSTRACT

A dispensing valve assembly comprising a slideable valve sleeve with a radially-directed dispensing outlet movable from closed position axially within a guide portion to open position axially-outwardly of the guide portion. Keying means between the guide portion and valve sleeve ensures that the dispensing outlet is normally directed downwardly but this keying means is flexible and can be overcome to permit twisting of the valve sleeve in the guide portion to break a seal connected therebetween. Finger-engaging means are also provided to facilitate closing.

8 Claims, 9 Drawing Figures

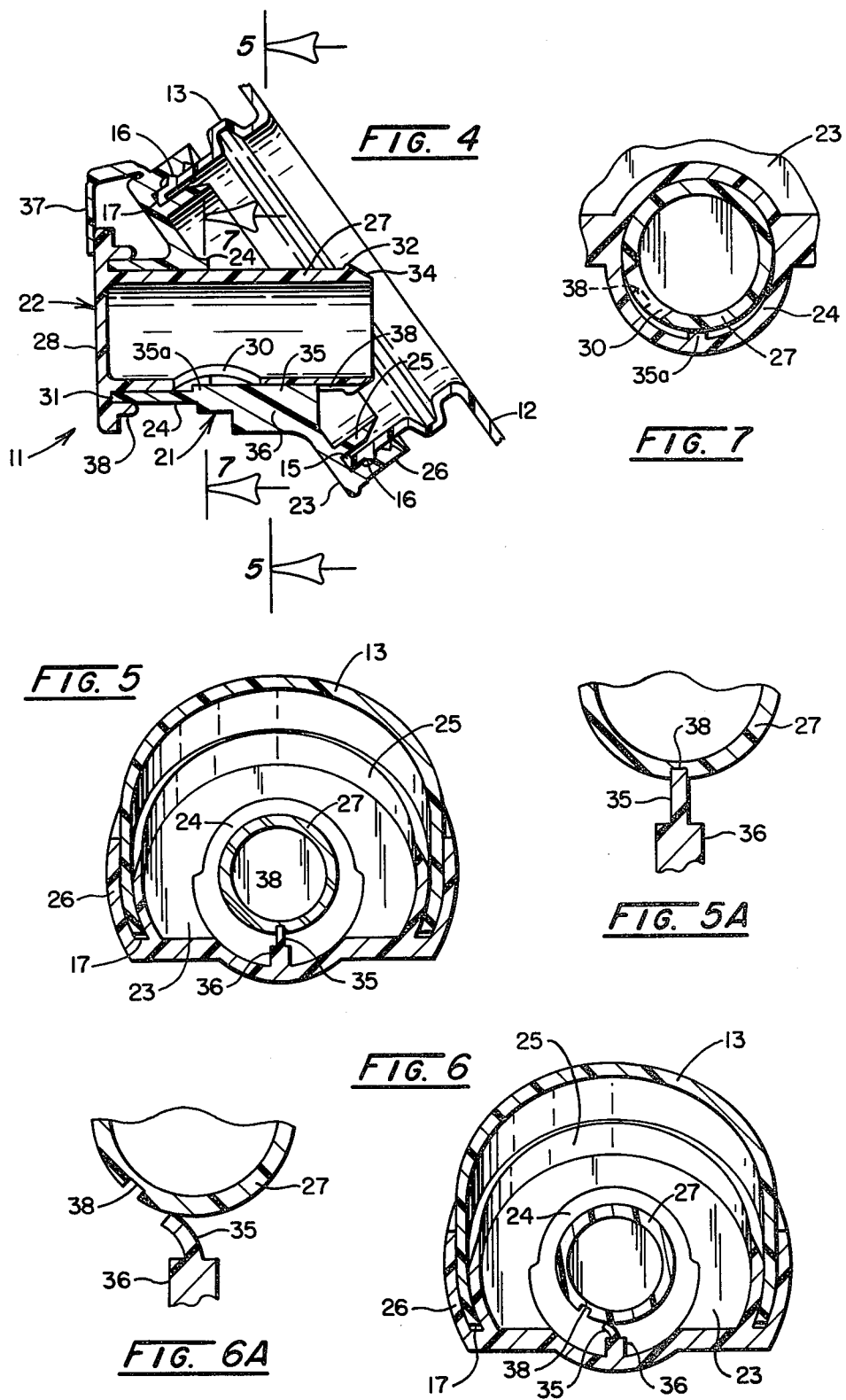

FINGER-ACTUATED PUSH-PULL SLIDEABLE DISPENSING VALVE

BACKGROUND AND PRIOR ART

This invention relates to a finger-activated push-pull slideable dispensing valve of the general type illustrated in U.S. Pat. No. 3,493,146 which is mounted on the angular wall at the corner of the liquid container disclosed therein to dispense liquids therefrom. The valve disclosed therein consisted of three main parts, i.e. a mounting cap and a guide sleeve, a positioning sleeve slideably telescoping in the guide sleeve, and a valve sleeve telescoping in the positioning sleeve, the valve sleeve having a dispensing outlet. The mounting cap was angled relative to the axis of the guide sleeve so that when it was mounted on the spout of the container that was carried on the angular wall of the container, the axis would be at a right angle to the face or front wall and parallel to the bottom wall of the container. Before use, the valve assembly was positioned within the angled corner behind the front wall of the container. To use the valve, it was intended to pull the positioning sleeve outwardly in its guide sleeve so as to move the valve assembly to a dispensing position beyond the front wall of the container. However, it was found, in actual practice, that this was seldom done and, therefore, the positioning sleeve was unnecessary.

A button or cap was formed on the outer end of the valve sleeve and included a pointer pointing in the radial direction of the dispensing outlet of the valve sleeve which had to be in a lower downwardly-directed position when dispensing but there was no means for definitely locating the valve sleeve and holding it in that position. A tamper-proof seal was provided which was a frangible strip connected to the valve cap and the mounting cap fitted on the spout. This seal had to be broken before or as the valve sleeve was moved outwardly to dispensing position relative to the mounting cap. In practice the tamper-proof seal strip was broken by rotation of the valve sleeve cap relative to the mounting cap and then the valve sleeve supposedly was returned to a position with its dispensing outlet directed downwardly but as indicated, there was no means for positively locating the valve sleeve in this position. Consequently, often the dispensing stream was not directed downwardly when the valve was opened.

SUMMARY OF THE INVENTION

According to this invention a finger-actuated slideable dispensing valve of the general type indicated is provided but is made of two parts rather than three and is therefore less costly. It consists of a mounting cap portion for mounting it on the spout of a container of the type indicated and which carries an integral guide sleeve portion at an angle thereto. Telescoping within the guide sleeve portion is a valve sleeve which has a cap on its outer end with an indicator pointer. The valve cap is connected to the mounting cap by a frangible strip which forms a tamper-proof seal. The valve sleeve has a radially-directed dispenser outlet near its outer capped end and to locate this outlet downwardly, as pointed out by the pointer, a special keying spline arrangement is provided between the valve sleeve and guide sleeve which permits sliding of the valve sleeve when engaged but permits rotation under sufficient torque pressure on the valve cap, to disengage the keying arrangement. This ordinarily keeps the dispensing outlet directed downwardly but permits relative rotation between the valve sleeve and guide sleeve initially to break the seal strip and positive relocation of the valve sleeve in dispensing position. Finger-engaging lugs are also provided on the mounting cap portion.

BRIEF DESCRIPTION OF THE DRAWINGS

The best mode contemplated in carrying out this invention is illustrated in the accompanying drawings in which:

FIG. 4 is an axial sectional view taken along line 4—4 of FIG. 2;

FIG. 5 is a transverse sectional view taken along line 5—5 of FIG. 4, showing the key in the key-receiving groove;

FIG. 5A is an enlargement of the keying arrangement of FIG. 5;

FIG. 6 is a view similar to FIG. 5 but showing the valve sleeve rotated to move the key out of the groove;

FIG. 6A is an enlargement of the keying arrangement in the condition shown in FIG. 6; and FIG. 7 is a transverse sectional view taken along line 7—7 of FIG. 4 and showing the valve sleeve rotated to the position of FIG. 6.

DETAILED DESCRIPTION OF THE INVENTION

Figure 1:
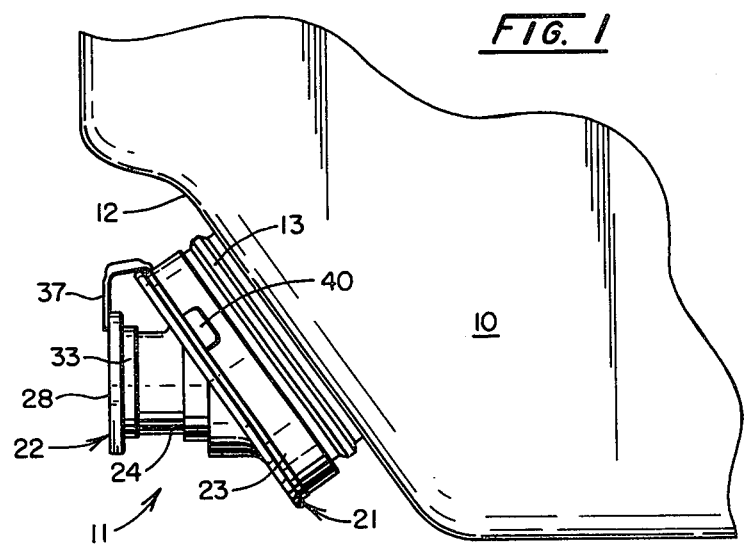
FIG. 1 is a side elevational view showing the valve of this invention mounted on the spout of a container of the angled-corner type.
Figure 2:
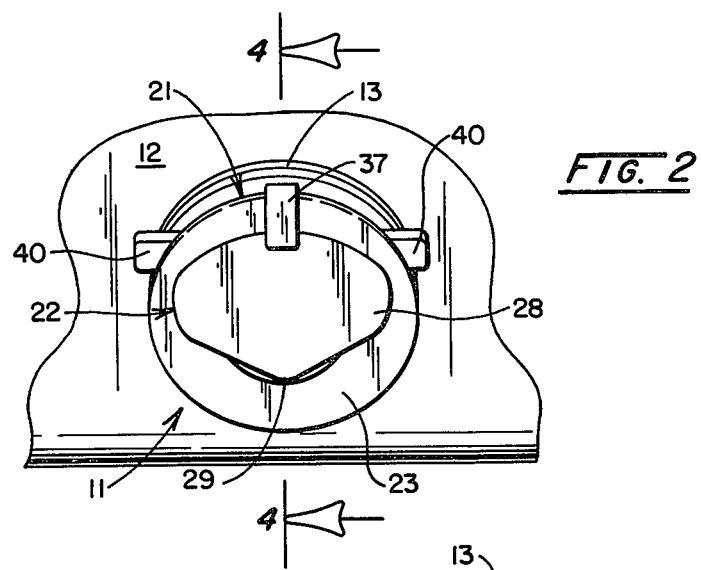
FIG. 2 is a front view of the assembly before the tamper-proof seal is broken.
Figure 3:
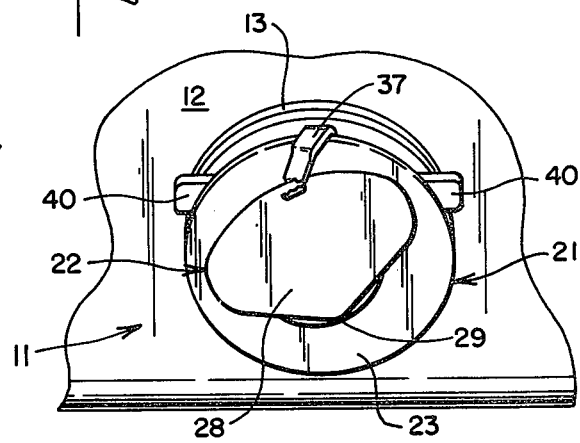
FIG. 3 is a similar view but showing the valve cap rotated to break the seal.

With reference to the drawings, in FIG. 1 there is shown a plastic container 10, for liquids of the type disclosed in U.S. Pat. No. 3,493,146. This container has a lower forward recessed corner in which the valve assembly 11 of this invention is disposed. The corner is formed by an angular or tilted wall 12 and carries the spout 13 by means of which the container is filled and emptied. The spout 13 is formed integral with the angularly-disposed transverse wall 12. The spout has an annular inner sealing surface 15 (FIG. 4) and an annular sealing ring 16 on its outer surface close to its outer end or lip 17.

The cap assembly 11 of this invention, as indicated, is made of only two plastic parts, namely, a mounting and guide unit 21 and a valve member 22. The mounting and guide unit includes the mounting cap portion 23 and the guide sleeve portion 24 which are integral with each other. The axis of the sleeve portion 24 is at an angle to the plane of the cap portion 23.

To mount the valve assembly 11 on the spout 13, the mounting cap is provided with a spout lip-receiving socket 17 formed between inner and outer concentric flanges 25 and 26 (FIG. 4) extending axially-inwardly from the body of the cap portion. The inner flange 25 extends axially into the spout and frictionally engages the sealing surface 15. The outer flange 26 extends axially inwardly to a greater extent over the spout sealing ring 16 and has a groove into which the ring 16 will snap as the cap portion is positioned on the spout. Thus, an axially inwardly-opening annular groove or socket is provided in the mounting cap portion 23 and when the cap portion is positioned on the spout 13, the ring 16 will snap into place in the receiving grooves in the outer flange to hold the cap portion on the spout. However, the cap portion and valve assembly carried thereby can be snapped off the spout when desired. The cap portion 23 is at such an angle relative to the guide sleeve portion 24 that the axis of the guide sleeve portion will be parallel to the bottom of the container 10 or normal to the front wall of the container.

Mounted for axial sliding movement in the guide sleeve portion 24 is the valve sleeve member 27 which is of elongated annular tubular form, open at its inner end and closed by a cap or button 28 at its outer end. This cap is of oval form and extends diametrically in opposite directions beyond the outer diameter of the valve sleeve 27. It also has an indicator pointer 29 which extends radially in the direction and plane of a radially-directed dispensing outlet 30 which is formed in the valve sleeve 27 adjacent its outer end. The cap has an inwardly-directed outer annular flange 33 which is concentrically-spaced from the valve sleeve 27 to form an annular axially-inwardly opening socket 31 for receiving the outer lip on the guide sleeve portion 24. The inner end of the valve sleeve 27 is provided with a stop shoulder 32 which engages with the inner end of guide sleeve portion 24 to limit outward sliding movement of the valve sleeve therein and at this time the outlet 30 will be beyond the guide sleeve portion for dispensing. The inner end of valve sleeve 27 is tapered at 34 to facilitate insertion into the guide sleeve.

For dispensing, it is important that the outlet 30 be directed downwardly. To positively locate the valve sleeve 27 in the guide sleeve portion 24 in the proper angular-relationship to accomplish this normally, a keying arrangement therebetween is provided which permits limited sliding movement of the valve sleeve between closed and opened positions for dispensing and rotative movement selectively under a twisting force.

This keying arrangement comprises a key or spline 35 which projects radially-inwardly from a supporting rib 36 (FIGS. 5 and 6) which is located at the lower side of the valve assembly at the junction of the guide sleeve 24 (FIG. 4) with the mounting cap portion 23 where it is angled inwardly. This is diametrically opposite the location of the tamper-proof seal which is in the form of a frangible strip 37 that is connected to the mounting cap portion 23 and the valve cap 23 where they come nearest together in closed position at the upper side of the valve assembly 11. The key 35 is laterally flexible and cooperates with and extends radially into a keyway or groove 38 formed in the outer surface of the valve sleeve 27 and extending longitudinally from the dispensing outlet 30 thereof to the inner extremity of the valve sleeve. It is important that this groove not extend through the wall of the sleeve so as to weaken it or cause leakage. It is also important that it be of such a depth that the valve sleeve 27 can be rotated in the guide sleeve 24 to snap the key 35 out of the groove, as indicated by a comparison of FIGS. 5 and 6 and associated FIGS. 5A and 6A. This is important in initially breaking the seal strip 37. A shallow groove with straight angular sides, as shown in FIGS. 5A and 6A, about two-thirds the thickness of the wall of the valve sleeve 27 has been found suitable. In an actual example, with a sleeve wall thickness of 0.060 inches, a groove 0.040 inches deep was found suitable. The key 35 must be sufficiently laterally flexible to permit snapping out of the groove when the valve sleeve 27 is twisted with sufficient torque by means of the valve cap 28.

It will be noted from FIG. 4 that with the valve closed, flexible key 35 extends outwardly below opening 30. It is provided with a further extension 35a which extends almost across the opening to a point outwardly beyond the inner stop end of sleeve portion 24 and which is formed on the interior of that guide sleeve portion 24 and will not be flexible. This extension will only function when valve sleeve 27 is moved to its outermost position. When valve sleeve 27 is twisted as in FIG. 7, the sleeve will flex slightly under radial pressure of key extension 35a.

Thus, the keying arrangement locates the dispensing outlet 30 in proper downwardly-directed dispensing position. It permits relative rotation to initially break the tamper-proof seal strip 37. It thereafter relocates the dispensing outlet properly and permits sliding movement of the valve sleeve 27 in the guide sleeve portion 24 between closed and opened positions.

In order to facilitate gripping of the valve by the fingers for pushing the valve sleeve 27 inwardly to closed position, the mounting cap portion 23 is provided with laterally-extending lugs 40 which can be engaged by two fingers while pushing on the valve cap 28 with the thumb, which is especially important when the container is almost empty.

It will be apparent that this invention provides a push-pull dispensing valve having a slideable valve sleeve with a dispensing opening, with keying means between the valve sleeve and a guide sleeve for positively locating the dispensing outlet in proper dispensing position. However, rotation of the valve sleeve under sufficient torque is permitted to initially break the tamper-proof seal.

Having thus described the invention, what is claimed is:

1. A valve assembly comprising a guide portion and a valve sleeve closed at its outer end and open at its inner end telescoping slideably therein; said guide sleeve having a radially-directed dispensing outlet movable axially-outwardly beyond the guide portion to open dispensing position from closed sealed position within the guide portion, a tamper-proof seal strip connected between the guide portion and the valve sleeve to prevent outward movement of the valve sleeve without breaking the seal strip, and means for keying the valve sleeve and guide portion together to permit sliding movement of the valve sleeve but to normally prevent rotative movement of the valve sleeve in the guide portion without the application of sufficient torque force to the valve sleeve to overcome the keying means so that the valve sleeve will rotate and break the seal strip; said keying means comprising a longitudinally extending keying groove in the outer surface of the wall of the valve sleeve, and a radially extending flexible key carried by the guide portion and extending into the groove, said groove extending only partially radially through said valve sleeve wall.

2. A valve assembly according to claim 1 in which the keying groove extends longitudinally from the outlet in the valve sleeve to the open end thereof.

3. A valve assembly according to claim 2 in which the key extends longitudinally of the guide portion and is laterally flexible.

4. A valve assembly according to claim 3 in which the guide portion is an outer sleeve having an inner end and the flexible key is supported inwardly of the sleeve and an extension of the key formed on the inner surface of the sleeve, said valve sleeve having a stop engaging the inner end of the sleeve.

5. A valve assembly according to claim 4 in which the keying groove has sharp angular sides.

6. A valve assembly according to claim 5 in which the groove extends radially no more than two-thirds into the thickness of the valve sleeve wall.

7. A valve assembly according to claim 1 in which the guide portion includes a mounting cap adapted to fit on a container spout, and finger-engaging lugs on said cap portion.

8. A valve assembly according to claim 7 in which the guide portion also includes a sleeve with its axis at an angle to the mounting cap.

* * * * *